United States Patent Office 3,338,108
Patented Aug. 29, 1967

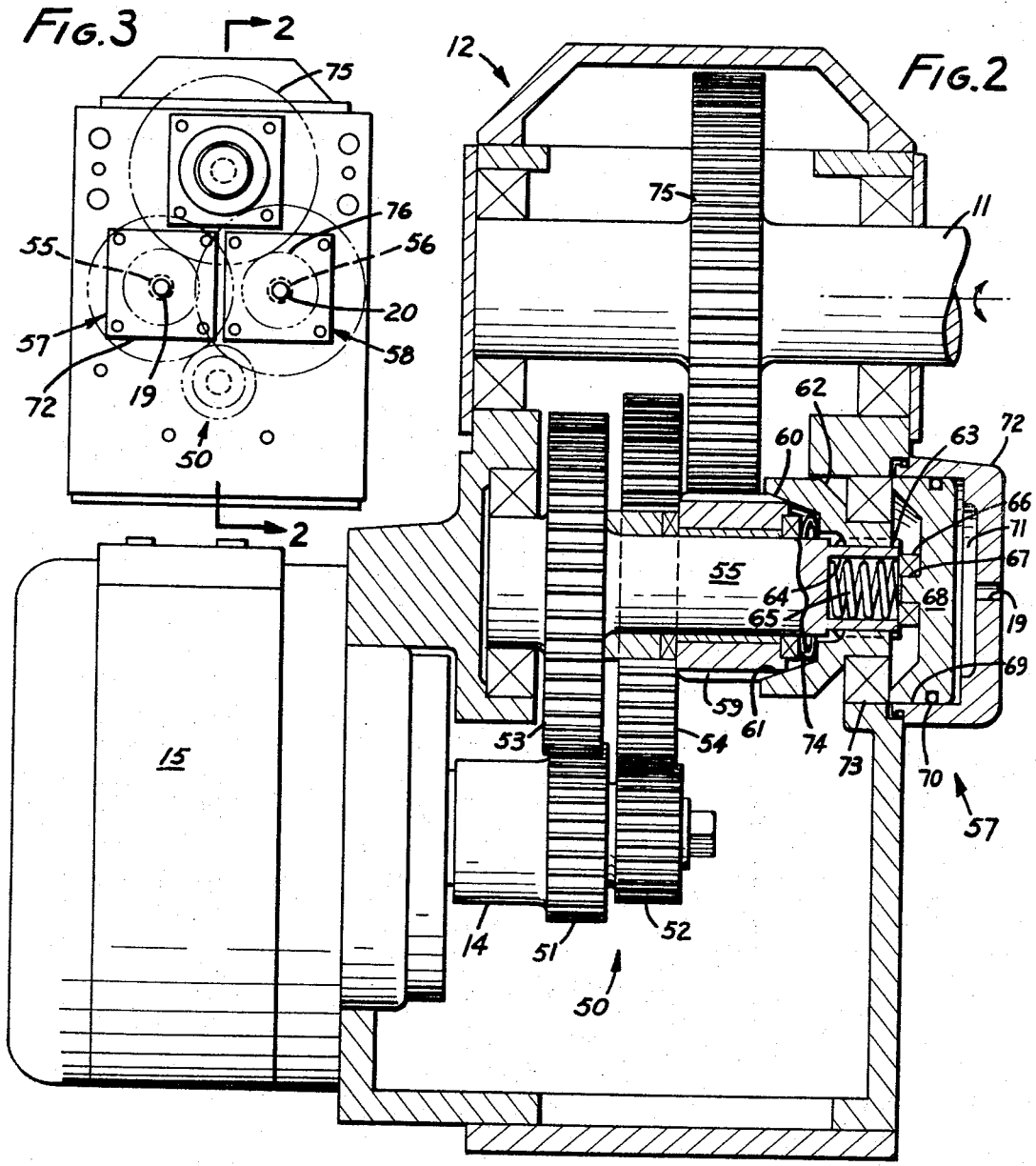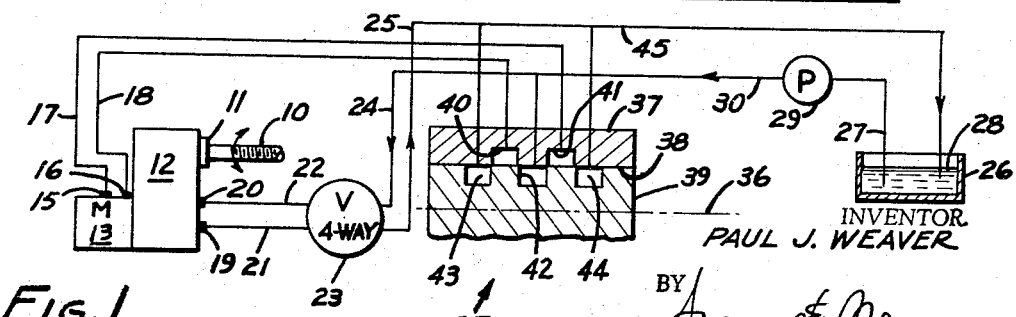

3,338,108
TRANSMISSION
Paul J. Weaver, Pasadena, Calif., assignor to True-Trace Corporation, El Monte, Calif., a corporation of Connecticut
Filed June 17, 1965, Ser. No. 464,655
11 Claims. (Cl. 74—359)

This invention relates to a transmission and to tracer controlled machinery in combination therewith.

In tracer controlled machinery there is invariably included an element comprising a four-way valve which has the characteristics of directing fluid under pressure to one side or the other of a fluid motor for powering the same and for returning exhaust fluid from the motor exhaust. The direction of operation is determined by which way a control element such as a stylus is moved, and the power passed by the valve is determined by the amount the valve is opened by the control element. Customarily the control element follows a pattern or a template, although it can often be actuated by other means.

A problem inherent in tracer valves is that they are ordinarily coupled to fluid motors whose rates of operation are proportional to the opening of the valve. Thus the rate of motion of a machine tool driving element such as a lead screw which is actuated by said fluid motor, is a function of the amount by which the tracer valve is opened. This relationship constitutes an undesirable limitation, for the reason that many times the loads which have to be overcome are such that for the same tracer valve opening, a greater or lesser speed is desirable. To increase the number of ranges of motor or driving element speed for a specific opening of the tracer valve would greatly increase the versatility of a tracer controlled machine tool. It is an object of this invention to provide such an advantage.

This invention principally comprises the combination of a reversible driving element for a machine tool such as a lead screw, together with a tracer valve that is adapted to supply power to drive said driving element. A reversible fluid motor is connected to the tracer valve to receive the power and convert it to torque, and a transmission having at least two speed ratios interconnects the driving element and the motor. This transmission has a plurality of speed ratios. Means is provided for selecting among the ratios whereby different driving element speeds are selectable for the same output of the tracer valve.

An especially advantageous transmission for this combination includes features which make it suitable for other uses as well, and includes actuator means for selecting the desired speed ratio comprising a fluid-actuated plunger-operated clutch effective to make said selection, together with fluid connections for actuating said clutch.

The above and other features of this invention will be fully understood from the following detailed description and the accompanying drawings, in which:

FIG. 1 is a system drawing partly in cutaway cross-section and partly in schematic notation showing the presently preferred embodiment of the invention;

FIG. 2 is a side elevation partly in cutaway cross-section of the transmission utilized in FIG. 1; and FIG. 3 is a right hand side view of FIG. 2.

FIG. 1 illustrates a reversible driving element such as a lead screw 10 whose reversible operation is to be controlled by the system. The lead screw is attached to and driven by the output shaft 11 of a transmission 12.

A motor 13 drives the input shaft 14 (FIG. 2) of the transmission. The motor housing is mounted to the transmission housing. This motor is a reversible, fluid powered motor of any conventional variety, such as a vane-type, which has a pair of motor supply ports 15, 16 adapted to receive fluid under pressure or exhaust as selected in a manner yet to be described from conduits 17, 18, respectively to drive the motor in either direction.

The transmission includes a pair of control ports 19, 20 which are connected by conduits 21, 22, respectively, to a four-way valve 23 which is connected to a pressure line 24 and to an exhaust line 25. Valve 23 has the function of closing to flow entirely, or to connect conduits 24, 25 selectively, alternatively and reversibly to conduits 21 and 22. A reservoir 26 receives exhaust fluid from line 25 and a pressure supply line 27 withdraws fluid 28 such as hydraulic liquid to supply pump 29, from which pump it is conveyed to pressure supply line 30, and thence to a tracer valve 35 and to pressure line 24.

Only that portion of the tracer valve which is necessary to the understanding of this invention is illustrated. For a more complete disclosure of a tracer valve, reference may be had to Rosebrook Patent No. 2,753,145 issued July 3, 1956. The tracer valve includes a four-way valve, usually as a spool valve, which has an axis 36. The valve includes a sleeve 37 having a cylindrical spool passage 38 to receive a cylindrical spool 39 which makes an axially slideable fluid sealing fit therewith. The wall of spool passage 38 has a pair of peripheral motor supply grooves 40, 41 which are respectively connected to conduits 18 and 17.

The external surface of the spool includes a peripheral central pressure groove 42 and a pair of peripheral exhaust grooves 43, 44. Customarily a stylus shifts the spool axially in the sleeve so as to cause a realignment of the grooves. The grooves are illustrated in the null, closed position of the tracer valve.

Pressure line 30 passes through the sleeve and opens into pressure groove 42 while exhaust line 45 branches to extend through the sleeve to communicate with both exhaust grooves 43 and 44, and thence to discharge into reservoir.

As an example of the operation of this valve, assume the spool to be moved to the left relative to the sleeve in FIG. 1. In this case pressure will pass from groove 42 to groove 40 through line 18 to operate the motor in one direction and exhaust fluid will proceed from the motor through line 17 to groove 41, thence to groove 44 and back to exhaust. Had the spool been moved to the right instead of to the left then pressure would have been applied to groove 41 and conduit 17, and exhaust fluid would have returned through conduit 18, grooves 40 and 43 and to exhaust, thereby reversing the direction of operation of the motor.

It will also be seen that the volume which can be passed by the tracer valve is proportional to the amount by which the grooves of the spool and the sleeve are permitted to communicate with each other. The farther the spool moves relative to the sleeve the more open will be the passages between the pressure groove and one of the motor supply grooves and the other of the motor supply grooves with the exhaust groove and this setting basically determines the rate of operation of the motor because it meters the power which is passed by it. The motor in turn drives the transmission and through that the driving element of the machine tool. It is the function of the transmission to provide a plurality of speeds of the element 10 for equal shifts of the spool within the sleeve.

The details of the transmission will be best understood from FIGS. 2 and 3. As can be seen therein, motor 15 drives the input shaft 14 of the transmission. The input shaft bears input gearing 50, which input gearing includes a first and a second gear 51, 52, these gears being fixed to the input shaft.

Gears 51 and 52 are respectively connected to speed change gears 53, 54, and this meshing is continuous. As can best be seen in FIG. 3, it is at this meshing intersection that two power paths separate from each other, the left hand path in FIGS. 2 and 3 being more fully discussed. It will be recognized that the resultant ratio of gears 51 and 53 will be different from the resultant ratio of gears 52 and 54, so that the output speed of the two paths for the same motor speed will be different. Each of the speed change gears is borne on a respective speed change shaft 55, 56, shaft 55 being illustrated in FIG. 2, shaft 56 being disposed behind it in this figure. Each of these shafts terminates at a respective clutch 57, 58. Both clutches are alike and only clutch 57 is illustrated in detail in FIG. 2. Attention is called to control port 19 in FIG. 2 at which pressure or exhaust is exerted from four-way valve 23.

Speed change shaft 55 supports freely and independently a clutch gear 59 having a conical clutch face 60. This clutch face faces toward, and is adapted to be engaged by, matching clutch face 61 on an axially shiftable member 62. This axially shiftable member is joined by splines 63 to the right hand end of shaft 55 so that it rotates therewith. A bore 64 in the same end of shaft 55 accommodates a spring 65 which bears against thrust bearings 66 that journal and support the spindle 67 of a plunger 68. Plunger 68 is not adapted for rotation and acts as a piston within a cylinder 69.

An O-ring 70 or other sliding peripheral seal makes a sliding fit with the wall of the cylinder and forms a pressure region 71 between the plunger and the housing 72 in which the pressure conditions in conduit 21 are exerted against the plunger. Sufficient pressure in region 71 moves the plunger to the left against thrust bearing 73 so as to force the conical clutch faces together and thereby drive clutch gear 59. The clutch faces are disengaged by a spring washer 74 when such force is not exerted, and also spring 65 tends to return the plunger toward the right in FIG. 2 when conduit 19 is connected to exhaust.

When the clutch is engaged, the respective clutch gear is caused to rotate, and turns an output gear 75. This output gear is, as can best be seen in FIG. 3, continuously connected to the clutch gears of both of the speed change shafts, clutch gear 76 being numbered for clarity in FIG. 3. When the output gear is driven, then the output shaft is similarly driven and this turns lead screw 10. As can be seen from the drawings, the housing for the entire unit, and various bearing supports for the other ends of the shaft are provided as necessary.

It will be evident from the foregoing that when ports 19 and 20 are connected to exhaust or at least not to sufficient pressure to move the pistons to engage the conical clutch faces, then both speed change shafts are running free and the output gear is not being driven. However, as soon as sufficient pressure is exerted in either of regions 71, then the plunger will move so as to engage the respective clutch faces, the clutch gear will be engaged to its respective speed change shaft and the output gear will be driven at the ratio provided by the selected power path. The clutch gear of the non-engaged clutch spins freely, meanwhile.

The plunger-piston and its associated circuitry comprises actuator means for actuating respective ones of the clutches and it will be seen that the four-way valve gives the options of neither clutch engaged and therefore no operation, or either selected one of the clutches being engaged by selection of which of the clutches receives pressure from the pressure source. This is a simple and inexpensive transmission suitable for this and other purposes but in the illustrated use provides a significant advantage for tracer controlled machinery in providing multiple gearing so as to provide greater flexibility of feed rates on tracer controlled machinery, while still using the same tracer valve.

This invention is not to be limited by the embodiments shown in the drawings and described in the description which is given by way of example and not of limitation but only in accordance with the scope of the appended claims.

What is claimed is:

1. A multiple speed transmission comprising: an input shaft; a pair of speed change shafts; an output shaft; input gearing driven by the input shaft; a pair of speed change gears, one mounted to each of said speed change shafts, both being engaged to the input gearing; an output gear mounted to the output shaft, a pair of clutches, one of said clutches being interposed between each of the speed change shafts and the output gear; and actuator means for individually actuating a selected one of the clutches to interconnect the respective speed change shaft to the output shaft, the ratio of the rotational velocities of the input shaft and the output shaft when one of said clutches is actuated being different from the ratio which exists when the other of said clutches is actuated.

2. A transmission according to claim 1 in which the clutches are cone-type clutches.

3. A transmission according to claim 1 in which the actuator means comprises a fluid-actuated plunger for each clutch effective to engage the same.

4. A transmission according to claim 3 in which the clutches are cone-type clutches.

5. In combination: a reversible driving element for a machine tool; a tracer valve adapted to supply power to drive said driving element, a reversible fluid motor connected to said tracer valve to receive said power and convert it to torque; a transmission having at least two speed ratios interconnecting the driving element and the motor, said transmission having a plurality of speed ratios; and means for selecting among ratios, whereby different driving element speeds are selectable for the same output of the tracer valve.

6. A combination according to claim 5 in which the driving element is a lead screw.

7. A combination according to claim 5 in which the transmission comprises: an input shaft; a pair of speed change shafts; an output shaft; input gearing driven by the input shaft; a pair of speed change gears, one mounted to each of said speed change shafts, both being engaged to the input gearing; an output gear mounted to the output shaft, a pair of clutches, one of said clutches being interposed between each of the speed change shafts and the output gear; and actuator means for individually actuating a selected one of the clutches to interconnect the respective speed change shaft to the output shaft, the ratio of the rotational velocities of the input shaft and the output shaft when one of said clutches is actuated being different from the ratio which exists when the other of said clutches is actuated.

8. A combination according to claim 5 in which the actuator means comprises a fluid-actuated plunger for each clutch effective to engage the same.

9. A combination according to claim 8 in which the clutches are cone-type clutches.

10. A combination according to claim 8 in which the actuator means includes a four-way valve, a source of fluid under pressure, and an exhaust, said four-way valve being interconnected between the two plungers, and the source and exhaust, whereby the clutches may be alternatively and selectively connected to the source and to exhaust.

11. A combination according to claim 9 in which the actuator means comprises a fluid-actuated plunger for each clutch effective to engage the same.

References Cited
UNITED STATES PATENTS

| | | | |
|---|---|---|---|
| 2,318,938 | 5/1943 | Hack | 60—62 |
| 3,150,537 | 9/1964 | Hermann | 74—364 |
| 3,174,349 | 3/1965 | Renker et al. | 74—359 |

ROBERT M. WALKER, *Primary Examiner.*

HENRY L. LAYTON, *Examiner.*